United States Patent [19]

Andrea

[11] Patent Number: 4,779,840

[45] Date of Patent: Oct. 25, 1988

[54] VALVE APPARATUS AND METHOD OF OPERATING THEREOF

[76] Inventor: Frederic E. Andrea, 13375 N. 100th Pl., Scottsdale, Ariz. 85200

[21] Appl. No.: 909,785

[22] Filed: Sep. 18, 1986

[51] Int. Cl.⁴ .......................................... F16K 25/00
[52] U.S. Cl. .................................. 251/174; 251/288; 251/315; 251/337
[58] Field of Search ............... 251/174, 288, 315, 337

[56] References Cited

U.S. PATENT DOCUMENTS

| | | | |
|---|---|---|---|
| 2,890,017 | 6/1959 | Shafer | 251/174 |
| 2,930,575 | 3/1960 | Britton | 251/174 |
| 2,973,182 | 2/1961 | Gill | 251/174 |
| 3,533,597 | 10/1970 | Bolling | 251/174 |
| 3,827,671 | 8/1974 | Bolden | 251/172 X |
| 4,266,566 | 5/1981 | Kacal | 251/174 X |
| 4,372,531 | 2/1983 | Rollins | 251/174 |
| 4,477,055 | 10/1984 | Pantridge | 251/174 |

FOREIGN PATENT DOCUMENTS 2167837 6/1986 United Kingdom ............... 251/174

Primary Examiner—Martin P. Schwadron
Attorney, Agent, or Firm—Wegner & Bretschneider

[57] ABSTRACT

An improved valve apparatus and a method of operation thereof having a spring retainer member means suitable for accommodating a spring means therein for operably coupling thereabove a pipe coupling body means are disclosed. Inside the pipe coupling body means is a ball headed member means having an aperture passing therethrough for blocking off or allowing passage of medium through the pipe coupling body means. The spring retainer member means is turned in one direction in order to allow unimpeded passage or to control the amount of flow thereof of said medium and can be rapidly and efficiently sprung back to its original position in order to completely block off the passage of said medium through the pipe coupling body means for a rapid and efficient "on-off" control thereof.

15 Claims, 3 Drawing Sheets

VALVE APPARATUS AND METHOD OF OPERATING THEREOF

BACKGROUND OF THE INVENTION

This invention generally relates to an improved valve apparatus and a method of operating thereof which has a spring retainer member suitable for accommodating a spring member therein for operably coupling thereabove a pipe coupling body. Inside the pipe coupling body is a ball headed member operably coupled to the spring retainer member suitable for blocking or allowing medium passage through the pipe coupling body.

Conventional valve devices often utilize a so-called flap valve which has an operably connected flap member inside a pipe member suitable for being operated outside the pipe member. Here, the flap member is operably coupled on at least one end to the inner surface of the valve device, the free end suitable for being moved. The flap member is suitable for being operably held at an upstanding position when passage of medium through the valve device is intended to be blocked. When passage of the medium through the valve device is required, the free end of the flap member is moved upwards for opening the passageway inside the valve device. Similarly, a so-called "butterfly" valve is readily available for use. In the so-called "butterfly" valve, a flap member is held inside the valve member, preferably at the middle portion thereof, in order to permit the ends of the flap member to be free and unobstructed. The middle portion of the flap member of the "butterfly" valve device can be manipulated from the exterior portion of the device for allowing the flap member to be in an upstanding position for stopping flow of medium through the valve device and flipped open for allowing flow therethrough.

These types of valve devices are, however, often ineffective, both in blocking off or in allowing the medium to pass through the valve devices. Here, unnecessary blockage of medium occur by the free end of the flap member of the flap valve device or the middle portion of the flap member in the "butterfly" valve device when in operation. Moreover, in both instances, leaks can occur therebetween the edges and the internal surface of the valve device when blockage of medium is required. Also, the flap members in both instances tend to jam inside the valve member due to various operational parameters, such as thermal expansions generated by the variegated medium temperatures passing therethrough, corrosion, bad fittings, or the like.

Thus, there is a dire need to provide an efficient and improved valve apparatus and a method of operation thereof in order to avoid the above-discussed problems. More particularly, a need is felt to provide an improved valve which can completely block off passing medium when desired, as well as allow the rapid, complete and efficient passage therethrough when required. Moreover, the improved valve should be suitable for being operated with efficiency and quickness.

It is therefore an object of the present invention to provide an improved valve apparatus and a method of operation thereof.

It is another object of the present invention to provide an improved valve apparatus and a method of operation thereof which is suitable for efficiently and completely blocking off medium passing through the improved valve; and rapidly, efficiently and unimpedingly allowing passage thereof when desired.

It is yet another object of the present invention to provide an improved valve apparatus and a method of operation thereof which is suitable for being spring loaded to provide a quick "on-off" feature for passage of medium therethrough.

It is a further object of the present invention to provide an improved valve apparatus and a method of operation thereof having a ball headed member therein with an aperture passing therethrough for blocking off and allowing a passage of medium therethrough.

It is yet a further object of the present invention to provide an improved valve apparatus and a method of operation thereof which can be easily and economically produced, yet sturdy in construction and highly efficient in operation.

It is yet a further object of the present invention to provide an improved valve apparatus and a method of operation thereof which is constructed with simplicity, embodying simple removable parts, and therefore capable of being retailed for a low price, long-lasting in use, and convenient to handle and operate.

SUMMARY OF THE INVENTION

The aforementioned and other objects of the present invention are accomplished by providing an improved valve apparatus and a method of operation thereof having a spring retainer member suitable for accommodating a spring member therein for being operably coupled thereabove a pipe coupling body are disclosed. The improved valve of the present invention further has a ball headed member with an aperture passing therethrough operably coupled to the spring retainer member for a quick "on-off" passage of medium passing therethrough. To further provide efficient operation of the ball headed member, a plurality of washers, including a washer having a plurality protruding spring members therefrom, are provided proximate the ball headed member. The improved valve apparatus and method of operation thereof can efficiently and completely block off passage of medium therethrough and can rapidly, efficiently and unimpedingly permit passage therethrough of said medium, when desired.

These and other features of the invention will be understood upon reading of the following description along with the drawings.

DESCRIPTION OF THE PREFERRED EMBODIMENTS

Figure 1:
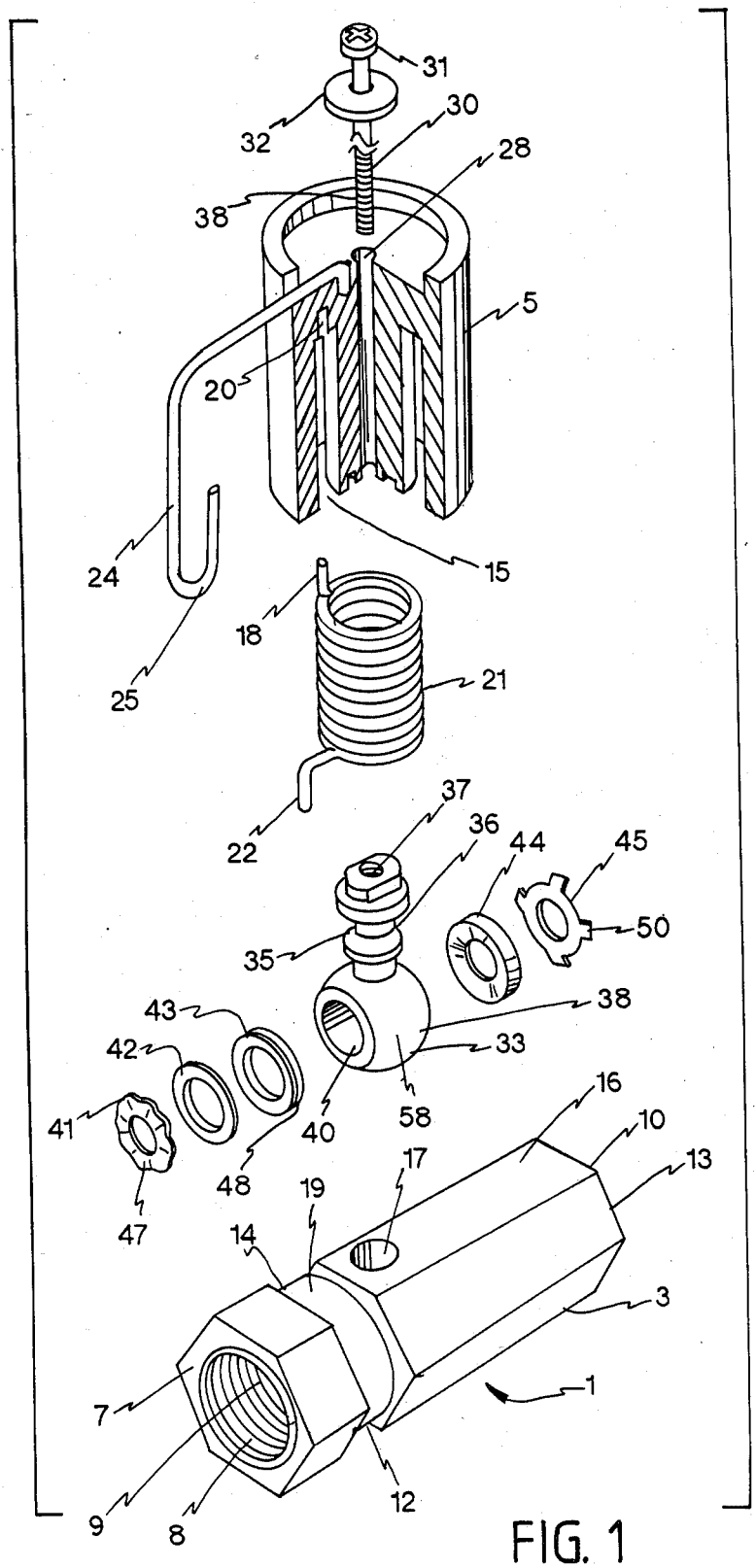
FIG. 1 is an exploded view of an improved valve of the present invention showing a plurality of internal and external parts thereof.

In FIG. 1, an exploded view of an improved valve, generally referred to by reference number 1, is shown having a pipe coupling body 3 with a spring retainer member 5 to be operably mounted thereabove. On a first end 7 of the pipe coupling body 3 are internal threads 8. On an opposing second end 10 of the pipe coupling body 3 are internal threads 11 (see FIG. 2, infra). On the first end 7 is a first aperture 9 passing therethrough while on the second end 10 is a second aperture 13 passing therethrough (see also FIG. 2, infra). Therealong an intermediate portion 12 of the pipe coupling body 3 is a groove 14. Passing therethrough a side 16 of the pipe coupling body 3 is an aperture 17 while on the intermediate portion 12 is a notch 19. The pipe coupling body 3 is preferably made out of sturdy, durable and long-lasting material, such as metal (e.g., brass, stainless steel or the like), plastic (e.g., PVC or the like), or the like. Thereabove the pipe coupling body 3 is the spring retainer member 5 having a space portion 15 therein for accommodating a spring member 21, preferably a coil spring. The spring member 21 has a first integral protruding end 18 suitable for being accommodated inside a notch portion 20 thereabove the space portion 15. Also, the spring member 21 has a second integral protruding end 22 suitable for being seated into the notch 19.

The spring retainer member 5 has a handle member 24 having a loop end 25 suitable for being easily gripped by a user. Preferably at the center of the spring retainer member 5 is an a central aperture 28 passing therethrough for accommodating therein a bolt 30. The bolt 30 with an integral bolt head 31 has a washer 32 therebetween the bolt head 31 and the spring retainer member 5.

Fitted inside the spring retainer member 5 is a ball headed member 33 with an upper extending member 35 having a threaded notch 37 for accommodating the external threads 38 of the bolt 30.

The ball headed member 33 has a ball portion 38 with a central aperture 40 passing therethrough. The axis of the central aperture 40 is substantially aligned with the axes of first 9 and second 13 apertures. When the ball headed 33 is fitted inside the pipe coupling body 3, the upper extending member 35 is initially passed through the aperture 13, then upwardly through the aperture 17 of the side 16 of the pipe coupling body 3. The upper extending member 35 preferably has a middle portion 36 thereof which is preferably configured to accommodate therein an O-ring member (not shown for clearly illustrating the middle portion 36) between the upper extending member 35 and the side 16 of the pipe coupling body 3 (see also FIG. 2, infra).

Proximate the first end 7 of the pipe coupling body 3 is a first set of washer members, comprising of a first 41, second 42 and third 43 washers. The first washer member 42, as shown in FIG. 1 has a plurality of integral wave configurations 47 and preferably made out of urethane or metal. The second washer member 42 is preferably a flat washer made out of non-corrosive material. The third washer member 43 is preferably made out of teflon having a groove therealong for accommodating a rubber ring 48.

Proximate the opposing second end 10 is a fourth washer member 44 and a retainer member 45 for retaining the ball headed member 33 in place. The fourth washer member 44 is preferably also made of teflon while the retainer member 45 is preferably made out of stainless steel. The retainer member 45 preferably also has a plurality of extending members 59 therefrom.

The spring retainer member 5 is preferably made out of a metallic material, such as "ZAMAC 3" or the like, preferably having a gold erudite finish. The handle member 24, including its loop end 25, are made of metal, such as spring steel or the like. The spring member 21 is preferably made out of stainless steel. The ball headed member, including its upper extending member 35 is made out of metal, such as brass or the like.

Figure 2:
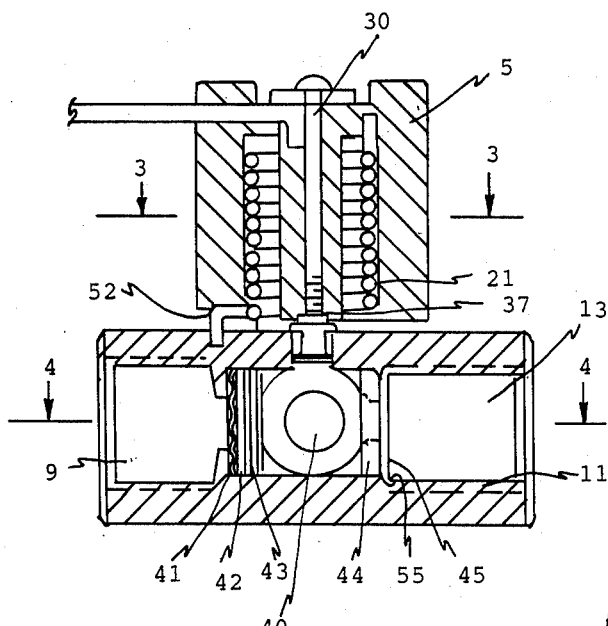
FIG. 2 is a cross-sectional view of the improved valve of the present invention when fully assembled.

As shown in FIG. 2, the spring member 21 which is completely deflected is accommodated inside the spring member 5 when the bolt 30 is screwed into the threaded notch 37 of the upper extending member 35 of the ball headed member 33. In order for the spring retainer member 5 to move when it is rotated, therebelow is a bottom notch portion 52 which is suitable for providing a space for the second integral protruding end 22 of the spring member 21.

As also shown in FIG. 2, the first 41, second 42 third 43 washers are placed adjacent to each other proximate the first aperture 9 of the pipe coupling body 3. After the ball headed member 33 is inserted into the pipe coupling body 3, the fourth washer member 44 is fitted thereto and thereafter, the retainer member 45 is fitted wherein the edges thereof are accommodated therein an internal groove portion 55 of the pipe coupling body 3. The non-apertured side 58 (see FIG. 1, supra) of the ball headed member 33 directly covers the first 9 and second 13 apertures in order for any medium to pass therethrough when the improved valve 1 is in use.

Figure 3:
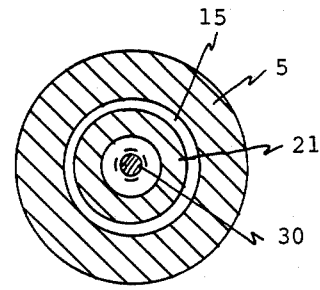
FIG. 3 is a cross-sectional view taken along line 3—3 of FIG. 2 of a spring retainer member with a spring member therein.
Figure 4:
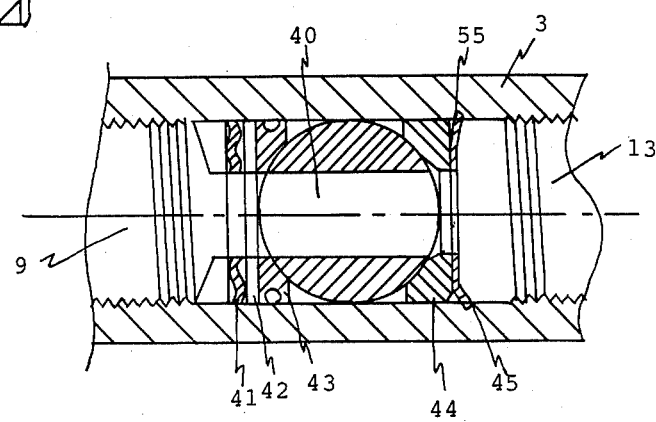
FIG. 4 is a cross-sectional view taken along line 4—4 of FIG. 2 of a pipe coupling body with a plurality of internal parts housed therein.

Due to the spring retainer member 5 being bolted onto the ball headed member 33, as also illustrated in FIG. 3, the spring retainer member 5 can be moved or rotated by the use of the handle member 24, either (1) for blocking off the first 9 and second 13 apertures of the pipe coupling body 3 with the use of the non-apertured side 58 or (2) for completely aligning the aperture 40 of the ball headed member 33 with the first 9 and second 13 apertures of the pipe coupling body 3, as shown in FIG. 4.

Figure 7:
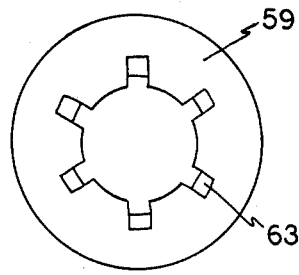
FIG. 7 is a top elevational view of the first alternative inside washer.
Figure 8:
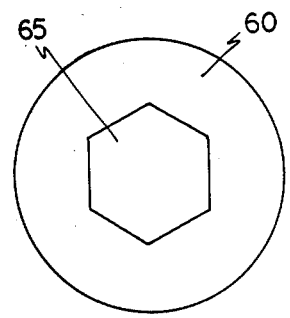
FIG. 8 is a top elevational view of a washer seal backup member.
Figure 5:
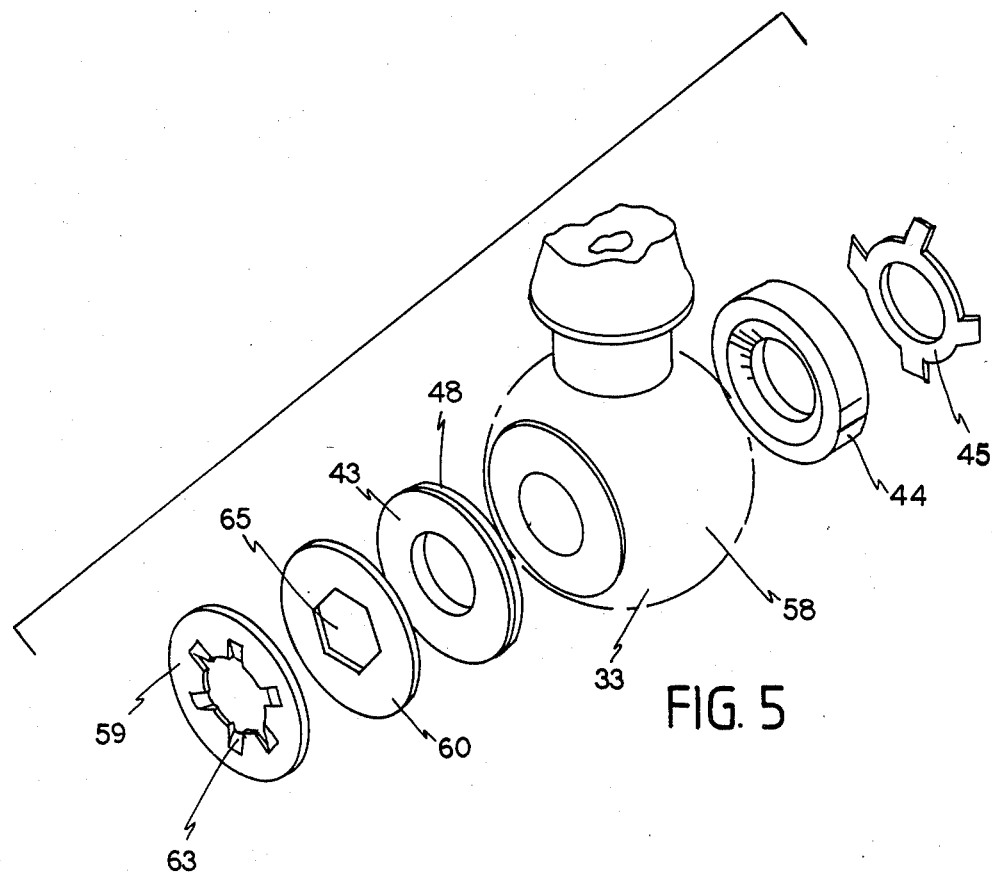
FIG. 5 is an exploded view showing the manner in which a first alternative inside washer having a plurality of integral spring means and an adjacent washer seal backup member are assembled proximate a ball headed member.
Figure 6:
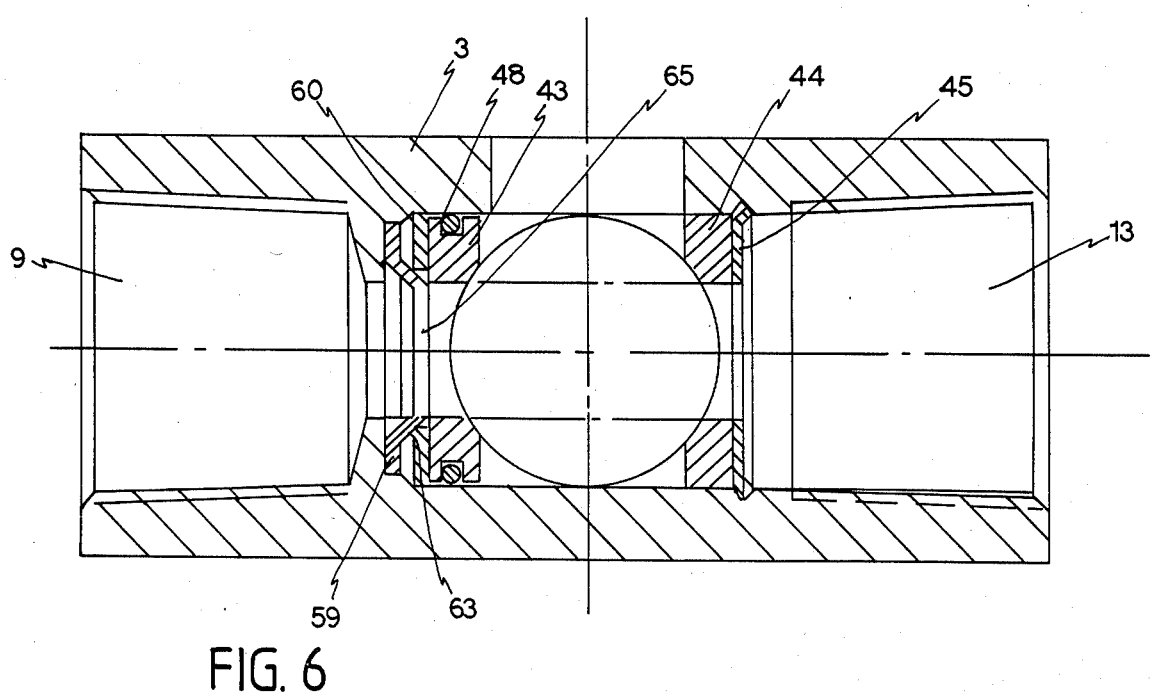
FIG. 6 is a cross-sectional view of a fully assembled improved valve of the present invention with the first alternative inside washer and the adjacent washer seal backup member in use.

As shown in FIG. 5, the first 41 and second 42 washer members (previously shown in FIGS. 1, 2 and 4) can be replaced with an alternative washer member 59 (see also FIG. 7, infra) and a seal backup washer member 60 (see also FIG. 8, infra), respectively. The alternative washer member 59, preferably made out of urethane or metal, has a plurality of internally protruding members 63 (see also FIG. 6, infra). The seal backup washer member 60 has a generally hexagonal-configured (although not limited thereto) aperture 65 passing therethrough. As further shown in FIG. 6, the plurality of internally protruding members 63 are initially impinged inwardly by the adjacent seal backup washer member 60 when first assembled, then an elongated driver member end (not shown) is inserted into the first aperture 9. The elongated driver member end, preferably has a hexagonal (although not limited thereto) end which can be fitted into the hexagonal-configured aperture 65 to thereafter twist off the alternative washer member 60 to permit the plurality of internally protruding members 63 to be generally "popped out" or released, thus efficiently providing a spring-induced operation at the ball portion 38 of the ball headed member when rotated during use.

Figure 9:
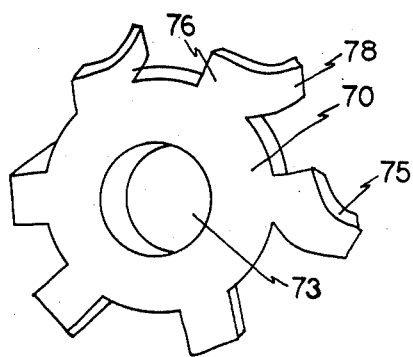
FIG. 9 is a perspective view of a second alternative inside washer having a plurality of integral spring means extending therefrom.

In FIG. 9, another alternative washer member 70 for replacing the washer member 47 and the alternative washer member 59 is shown. Also, the another alternative washer member 70 with an aperture 73 passing therethrough is made out of urethane or metal and has a plurality of internally protruding members 75. Here, each protruding member 75 has an extending portion 76 with a protruding portion 78 therefrom for impinging with the adjacent seal backup washer member 60 (see, e.g., FIG. 6).

When in use, passage of medium initially occurs at the second aperture 13 then through the first aperture 9 of the pipe coupling body 3.

Also when in use, the initial position of the ball headed member 33 is as shown in FIG. 2, supra, and, as described above, for initially blocking off the medium passing therethrough the first 9 and second 13 apertures. When flow of medium is required to pass through the first 9 and second 13 apertures, the ball headed member 33 is rotated by the turning of the handle member 24 in order for the aperture 40 of the ball portion 38 of the ball headed member to be partially or fully aligned (see, e.g., FIG. 4, supra) with the first 9 and second 13 apertures of the pipe coupling member 3, thus allowing therethrough a controlled passage of medium therein.

While the invention has been particularly shown and described to preferred embodiments thereof, it will be understood by those skilled in the art that changes in form and details may be made therein without departing from the spirit and scope of the invention.

I claim:

1. A valve, comprising:
a pipe coupling body means for connecting to at least one pipe member means, said pipe coupling body means has a longitudinal aperture passing therethrough its axis, said pipe coupling body means further has at least one aperture passing therethrough generally perpendicular to said axis;
a ball headed member means being accommodated inside said pipe coupling body means for controlling flow of medium passing therethrough, wherein said ball headed member means has an aperture passing therethrough, and wherein said ball headed member has a stem portion joined thereto for passing through said aperture generally perpendicular to said axis of said pipe coupling body means;
a spring retainer member means for housing a spring means therein operably coupled to said pipe coupling body means and said ball headed member means, wherein said spring retainer member means has a portion for accommodating said spring means when said spring retainer means travels through an ON/OFF position of said valve, and wherein said spring retianer comprises an external stop means for positioning the ON or OFF location of said valve while engaging a portion of said spring means coupled to said pipe coupling body;
a plurality of inside washer means for seating on a first side of said ball headed member means;
at least one outside washer for seating on a second side of said ball headed member means;
at least one ball retainer member means placed adjacent said at least one outside washer means for keeping said ball headed member means inside said pipe coupling body means;
a handle member means integrally coupled thereabove said spring retainer member means for operating said spring retainer member means; and
a bolt which passes through said spring retainer member means for directly connecting with said stem portion.

2. The valve as in claim 1 wherein said pipe coupling body means has internal threads on each opposing opening portions for coupling to said at least one pipe member.

3. The valve as in claim 2 wherein said pipe coupling body means has an internal groove therealong its internal surface for accommodating therein said at least one ball retainer member means.

4. The valve as in claim 3 wherein said spring means has a first protruding end and an opposing second protruding end.

5. The valve as in claim 4 wherein said spring retainer member means has a space means for fitting said spring means therein.

6. The valve as in claim 5 wherein said space means in said spring retainer member means has an indentation means for fitting said first protruding end of said spring means therein.

7. The valve as in claim 6 wherein said pipe coupling body means has an external notch means for fitting said second protruding end of said spring means therein.

8. The valve as in claim 7, wherein said stem portion of said ball headed member means is accommodated therein said at least one aperture of said pipe coupling body means substantially perpendicular to its axis.

9. The valve as in claim 8 wherein at least one of said plurality of inside washers has a plurality of wave-configured protrusions suitable for being initially impinged for pre-loading.

10. The valve as in claim 9 wherein at least one of said plurality of inside washers and said at least one outside washer are generally flat and made of Teflon.

11. The valve as in claim 8 wherein at least one of said plurality of inside washers has a plurality of spring means extending therefrom.

12. The valve as in claim 11 wherein at least one of said plurality of inside washers is a washer seal backup member means for impinging onto said plurality of spring means of said at least one of said plurality of inside washers.

13. The valve as in claim 12 wherein said washer seal backup member means has an aperture passing therethrough, said aperture of said backup member means has a generally hexagon configuration.

14. The valve as in claim 13 wherein said pipe coupling body means has an internal portion means for accommodating therein (a) said inside washer having a plurality of spring means extending therefrom, and (b) said washer seal backup member means.

15. The valve as in claim 1, further comprising a top O-ring member means for directly seating between said pipe coupling body means and said stem portion of said ball headed member means.

* * * * *